United States Patent [19]

Elcik

[11] 4,129,535

[45] Dec. 12, 1978

[54] FIRE RETARDANT POLYVINYL CHLORIDE CONTAINING COMPOSITIONS

[75] Inventor: Robert G. Elcik, Mount Holly, N.J.

[73] Assignee: Stauffer Chemical Company, Westport, Conn.

[21] Appl. No.: 638,734

[22] Filed: Dec. 8, 1975

Related U.S. Application Data

[62] Division of Ser. No. 502,590, Sep. 3, 1974, Pat. No. 3,983,290.

[51] Int. Cl.$^2$ .................... C08K 5/10; C08K 5/51; C08L 27/06; C08L 91/00
[52] U.S. Cl. ................. 260/23 XA; 260/30.6 R; 260/42.49; 260/45.7 R; 260/45.7 PH; 260/45.75 B; 260/45.75 W; 526/1; 526/2
[58] Field of Search ............... 260/45.75 W, 45.7 PH, 260/42.49, 30.6 R, 45.7 R, 23 XA; 526/1, 2

[56] References Cited

U.S. PATENT DOCUMENTS

| | | | |
|---|---|---|---|
| 2,650,908 | 9/1953 | Beears | 260/30.6 R |
| 2,668,119 | 2/1954 | Horback et al. | 260/30.6 R |
| 2,669,548 | 2/1954 | Darby et al. | 260/30.6 R |
| 3,318,757 | 5/1967 | Atwell | 161/193 |
| 3,575,779 | 4/1971 | Chapman et al. | 161/89 |
| 3,723,139 | 3/1973 | Larkin et al. | 260/45.75 R |
| 3,816,367 | 6/1974 | Larkin et al. | 260/29.6 R |
| 3,872,041 | 3/1975 | Koerber | 260/45.75 R |
| 3,945,974 | 3/1976 | Schwarcz et al. | 260/45.75 W |

FOREIGN PATENT DOCUMENTS

| | | | |
|---|---|---|---|
| 1080468 | 8/1967 | United Kingdom. | |
| 1147009 | 4/1969 | United Kingdom | 526/2 |

OTHER PUBLICATIONS

Payne, "Organic Coating Technology", vol. I, 1954, pp. 389–401.

"S/G 84", The Burns & Russell Co., 506 S. Central Ave. Baltimore, Md., pp. 1–12.

"Blending or Compounding with Dow CPE Resins," 1971, pp. 1–14, Form No. 301-93-71.

Modern Plastics Encyclopedia, vol. 44, No. 1A, Sep. 1966, pp. 446, 448, 452 and 453.

Primary Examiner—Allan Lieberman
Attorney, Agent, or Firm—Richard P. Fennelly

[57] ABSTRACT

Compositions for preparing fire retardant polyvinyl chloride films characterized by their unusual combination of low flame spread, low smoke density, reduced permeability for vapor transmission and good cold crack resistance are described. These film forming compositions comprise a blend of about 40–55% polyvinyl chloride, about 7–20% of chlorinated polyethylene, about 4–20% of a phosphate ester plasticizer, about 3–7% of a magnesium hydroxide filler, about 3–6% of zinc borate and about 3–6% of an antimony trioxide fire retardant with various lubricants, pigments and stabilizers being included where desired. The films derived from the above blend enjoy particular utility in preparing vapor barrier constructions for use in the building trade.

13 Claims, No Drawings

FIRE RETARDANT POLYVINYL CHLORIDE CONTAINING COMPOSITIONS

RELATED APPLICATIONS

This is a divisional application of U.S. Ser. No. 502,590, filed Sept. 3, 1974, now U.S. Pat. No. 3,983,290, dated Sept. 28, 1976.

TECHNICAL DESCRIPTION OF THE INVENTION

As is known to those skilled in the art, the construction of buildings often requires the use of fire or flame retardant jacketing, facing materials for heating duct insulation, and similar applications involving plies of combustible sheet material or plies of such sheet materials laminated to various substrates such as aluminum foil and fiber glass batting. Because of its low cost and versatility, polyvinyl chloride (hereinafter referred to as PVC) is often used to prepare such sheet materials by being blended with various additives which are designed to impart the required flame retardant characteristics.

With respect to these fire retardant properties, they may be broken down into two specific requirements. The first of these involves the ability of the PVC composition to retard the spread of flame subsequent to being ignited. This factor is referred to as "flame spread." The second requirement for fire retardant sheeting relates to the quantity of smoke which it evolves on burning and is referred to as "smoke density." The latter properties are usually evaluated by means of the procedures set forth in Underwriter's Laboratory, Inc. "Standard for Test Method for Fire Hazard Classification of Building Materials," subject 723, published August, 1950. Thus, the Underwriter's Laboratory 90B Ratings require a maximum flame spread of 25 and a maximum smoke density of 50 for vapor barrier constructions.

Unfortunately, it has not generally heretofore been possible to provide fire retardant PVC films and sheeting whose flame spread and smoke density ratings were both able to meet the minimum standards imposed by the Underwriter's Laboratory Inc. rating. Thus, where low flame spread was achieved, smoke density remained deficient. Conversely, where smoke density of the PVC film was adequate, its flame spread failed to meet minimum standards. Clearly, therefore, a need is seen to exist for the development of a PVC composition capable of yielding films which display a combination of low flame spread and low smoke density.

Thus, it is an object of this invention to provide compositions capable of yielding films and sheeting characterized by their unique combination of low flame spread and low smoke density. Another object is to form a flame retardant PVC composition having good cold crack properties. It has been found that use of chlorinated polyethylene reduces the temperature at which the film will crack as measured by the Masland S.P.I. cold crack test. This allows installation of the final product on the job site at lower temperatures than would ordinarily be possible. Prior art methods of obtaining a lower cold crack point, i.e. through the use of adipate plasticizers, adversely affect the flame retardant effect of the film which results therefrom. Still another object is the formation of excellent vapor barrier compositions. The film forming composition also possesses excellent low water transmission properties which is important for the vapor barrier properties of the film. This can be measured by ASTM E96, Method A.

In brief, the products of this invention are film forming compositions, as well as the films and sheets derived therefrom, comprising an intimate admixture of a vinyl chloride polymer, a chlorinated polyethylene, a phosphate ester plasticizer, an antimony trioxide flame retardant, a fine particle size magnesium hydroxide filler, and zinc borate, together with such ingredients as lubricants, fillers, pigments, and stabilizers, etc., whose presence may be desired by the practitioner.

The vinyl chloride polymers applicable for use in preparing these novel film forming compositions should, preferably, have a low molecular weight which, as expressed in terms of its Relative Viscosity, at 25° C., as determined in a 1% by weight, solution in cyclohexanone, should be in the range of from about 2.00 to 2.45, with optimum results being obtained with vinyl chloride polymers having a Relative Viscosity value of about 2.20 to 2.30. The use of such low molecular weight vinyl chloride polymers in the film forming compositions of this invention is of substantial significance since their presence aids in obtaining the desired properties of tensile strength, tear strength and good elongation in the films prepared from these novel compositions. Moreover, the combination of such low molecular weight vinyl chloride polymers with the high percentage of various inert materials which are utilized in preparing the film forming compositions of this invention facilitates the rapid fusion and blending of these compositions. Although PVC is the preferred vinyl chloride polymer for use in preparing the products of this invention, it should be noted that it is also possible to employ copolymers of vinyl chloride with minor proportions of one or more ethylenically unsaturated, i.e. vinyl comonomers, including: alpha-olefins, such as ethylene, propylene and butylene; vinyl esters of carboxylic acids, such as vinyl acetate, vinyl propionate, vinyl butyrate, and vinyl stearate; the $C_1$–$C_{20}$ alkyl esters of acrylic and methacrylic acid, such as methyl methacrylate, ethyl methacrylate, methyl acrylate, ethyl acrylate, butyl acrylate, 2-ethylhexyl acrylate and lauryl acrylate; aryl, halo- and nitro- substituted benzyl esters of acrylic and methacrylic acid such as benzyl acrylate and 2-chlorobenzyl acrylate; ethylenically unsaturated monocarboxylic-acids, such as acrylic and methacrylic acids; ethylenically unsaturated dicarboxylic acids, their anhydrides and their $C_1$–$C_{20}$ mono- and dialkyl esters, such as aconitic acid, fumaric acid, maleic acid, itaconic acid, citraconic acid, maleic anhydride, dibutyl fumarate and mono-ethyl maleate; amides of ethylenically unsaturated carboxylic acids, such as acrylamide and methacrylamide; vinyl aryl compounds, such as styrene and alpha-methyl styrene; nitriles of ethylenically unsaturated carboxylic acids, such as acrylamide and methacrylamide; vinyl aryl compounds, such as styrene and alpha-methyl styrene; nitriles of ethylenically unsaturated carboxylic acids, such as acrylonitrile and methacrylonitrile; vinyl pyrrolidones, such as N-vinyl-2-pyrrolidone; $C_1$–$C_{20}$ alkyl vinyl ethers, such as methyl vinyl ether, ethyl vinyl ether and stearyl vinyl ether; dienes, such as isoprene and butadiene; and, glycidyl esters of acrylic and methacrylic acid, such as glycidyl acrylate and glycidyl methacrylate, etc. Thus, it is to be understood that the use in this disclosure of the term "vinyl chloride polymer" is meant to encompass both polyvinyl chloride and copolymers of vinyl chloride with a minor proportion of one or more vinyl comonomers.

The chlorinated polyethylene which also forms a portion of the film forming composition should have a chlorine content of about 35% to about 45%. Suitable chlorinated polyethylenes are Dow Chemical Co's CPE blending or compounding resins.

The phosphate ester plasticizers applicable for use in the PVC film forming compositions of this invention are orthophosphate esters such as triaryl phosphates, e.g., tricresyl phosphate, cresyl diphenyl phosphate, isopropylphenyl diphenyl phosphate, alkyl diaryl phosphates, e.g., diphenyl 2-ethylhexyl phosphate; aryl dialkyl phosphate and mixtures thereof and trialkyl phosphates, e.g., tris(dichloropropyl) phosphate; orthophosphate ester plasticizers resulting from the phosphorylation of naturally occurring materials such as coal tar as described in British Pat. No. 837,679; as well as synthetically manufactured ortho-phosphate ester plasticizers as described in British Pat. No. 1,146,173. These plasticizers are relatively involatile and provide the resulting films with good low temperature flexibility characteristics.

The antimony trioxide flame retardant which is incorporated into the film forming compositions of this invention should, preferably, have a particle size below about 5 microns and a fineness such that about 97.2%, by weight, will pass through a 325 mesh U.S. Standard Screen size. Its presence serves to substantially reduce the smoke density and also contributes to the reduction of flame spread in the PVC films derived from these film forming compositions. Particularly useful for this purpose is a composition containing:

(a) a major proportion of a mixture of the cubic, i.e. senarmonite, and orthorhombid, i.e. valentinite, crystallographic forms of antimony trioxide with (b) a minor proportion of magnesium and sodium compounds. A commercially available material conforming to the latter specifications is the product sold under the trademark "Thermoguard B" by M & T Chemicals, Inc.

Another required component of the unique film forming compositions of this invention is a fine particle size, magnesium hydroxide filler with the use of the naturally occurring mineral brucite being preferred. The latter should preferably have a particle size such that at least 99% of the particles have a diameter of less than 45 microns. In addition, it should have a low oil absorption value, preferably in the range of about 22 cc/100 grams. This filler serves to further enhance the flame spread and smoke density characteristics of the films derived from the PVC film forming compositions of this invention. Being naturally derived products, these magnesium hydroxide fillers will often contain trace amounts of other elements such, for example, as calcium, copper, iron and silicon. Exemplary of the magnesium hydroxide fillers applicable for use in these novel compositions is the product sold under the trademark "S/G 84" by the Burns & Russell Company which comprises brucite with some $MgCO_3$ and/or $Mg(OH)_2 2MgSO_4$ being present as minor components.

The film forming composition of the present invention also contains zinc borate. This salt has been found to substantially reduce the flame spread and smoke density of the film forming composition.

With respect to proportions, the film forming composition of this invention should contain from about 40 to 55%, by weight, of a vinyl chloride polymer, from about 7–20% of the chlorinated polyethylene, from about 4 to 20%, by weight, of the selected phosphate plasticizer, from about 3 to 6%, by weight, of the antimony trioxide flame retardant, from about 3 to 7%, by weight, of the fine particle size magnesium hydroxide filler, and from about 3–6%, by weight, of zinc borate.

It is to be understood that all of the above stated proportions are based upon the total weight of the resulting film forming composition.

As has been noted, hereinabove, the film forming compositions of this invention may, if desired, be prepared so as to contain effective amounts of various optional ingredients. Thus, one may introduce fillers and pigments such, for example, as talc, calcium carbonate, mica and clay; lubricants such, for example, as stearic acid, calcium stearate, polyethylene and various waxes; and, stabilizers such, for example, as octyl epoxy tallate, epoxidized soya bean oil, barium-cadmium-zinc complex salts, organic phosphates, tin containing compounds, and lead containing compounds. If a non-blocking film is desired, about 0.1 to about 0.5%, by weight, of a lubricant such as stearic acid or calcium stearate and from about 0.1% to 0.5% of a partially oxidized polyethylene such as Allied Chemical Co.'s 629A, should be present in the formulation.

The actual preparation of the film forming compositions of this invention will ordinarily involve the initial step of admixing of the solid ingredients including the PVC, the antimony trioxide flame retardant, the zinc borate, the magnesium hydroxide filler and any optional pigments and other solid materials in a blender. Any conventional blender apparatus, such for example, as a ribbon blender and high speed mixers such as the Henschel mixers can be utilized for this purpose. The required phosphate plasticizer, as well as any desired optional ingredients which are liquids, are then blended with one another and are thereupon added to the solid PVC containing mixture. The chlorinated polyethylene is added and all ingredients are mixed over a period of about 30 minutes. At this point, any lubricants whose presence is desired should be blended with the composition over a period of about 10 minutes.

Next, the now complete composition should be treated in an apparatus capable of fluxing it and thereby producing an exceedingly uniform composition. Suitable equipment for this purpose includes the Intermix sold by Adamson United and the Kokneader sold by Baker Perkins. It is important that this operation should also serve to drive off as many volatile components from the composition as is possible. Thus, the presence of an excessive concentration of volatiles will have a deleterious effect upon the flame spread and smoke density characteristics of the films derived from these compositions. More particularly, it is preferred that the concentration of volatiles in these film forming compositions should be no more than about 2.0%, by weight, when tested for three hours in a circulating air oven at 220° F. Subsequent to the fluxing operation, the resulting composition may then be stored or immediately passed through a calender or other suitable apparatus which is capable of sheeting it into the form of a thin, self-supporting film. The resulting films may have a thickness in the range of from about 2 to 60 mils with a thickness of about 3.2 mils being optimum for most purposes. Those skilled in the art will, of course, realize that the above described preparatory procedure is merely illustrative and may be varied, as desired, in any convenient manner.

The films derived from the novel film forming composition of this invention display flame spread and smoke density characteristics well below those heretofore attainable. They are therefore, exceptionally well suited for use in any number of building construction applications wherein the materials utilized must display flame retardant properties. Thus, these films can be used for the preparation of vapor barrier constructions by being laminated to a section of fiber glass batting having a thickness of about 0.25 to 3.0 inches with a suitable fire retardant adhesive such as, for example, the aqueous based adhesives containing one or more vinyl type homo- or copolymers dissolved or emulsified therein.

The following examples will further illustrate the embodiment of this invention. In these examples all parts given are by weight unless otherwise noted.

EXAMPLE I

This example illustrates the preparation of a preferred PVC film forming composition typical of the novel products of this invention as well as its subsequent conversion into the form of a self-supporting film.

A total of 41.554 parts of a low molecular weight PVC resin having a Relative Viscosity as determined in a 1%, by weight, solution in cyclohexanone, at 25° C., of 2.25 was mixed, at ambient temperature, in a ribbon blender together with 4.87 parts of an antimony trioxide flame retardant ("Thermoguard B"), 4.27 parts of zinc borate flame retardant and 4.3 parts of a magnesium hydroxide, (brucite), filler ("S/G 84"). Next, 14.5 parts of diphenyl 2-ethylhexyl phosphate, 3.5 parts of octyl epoxy tallate, 3.0 parts (in equal portions) of two barium-cadmium containing stabilizers, sold by the Nuodex Division of Tenneco Chemicals, Inc. as "Nuostabe V-1541" and "Nuostabe V-1542," were blended together and then combined with the PVC containing mixture. About 15.18 parts of chlorinated polyethylene (Dow Chemical CPE) was then added, and the resulting product was intimately admixed for 30 minutes. To the resulting blend, there was then added, as a lubricant, 0.2 parts of stearic acid and 0.2 parts of calcium stearate. The now complete composition was admixed for an additional 10 minutes then conveyed to a Kokneader apparatus where it was thoroughly fluxed over a period of 1 to 2 minutes thereby providing it with a high degree of uniformity. The composition was then calendered so as to yield a film having a thickness of about 3.2 mils.

When a sample of this film was evaluated by means of the procedure described in Underwriter's Laboratory, Inc. "Standard for Test Method for Fire Hazard Classification of Building Materials, Subject 723 (UL 90 B ratings)" it was found to have excellent fire retardant properties as shown by its flame spread value of 17.9 and its smoke density value of 78.1. The cold crack resistance was rated "pass" at −20° F. (Masland S.P.I. cold crack test, ASTM D1790-62) and the water vapor transmission was 0.86 g/100 in$^2$ in 24 hours (ASTM E-96, Method A).

This film was then used for the preparation of a vapor barrier construction by being laminated to a one inch thick section of a fiber glass batting using an aqueous based adhesive composition having a vinyl chloride polymer dissolved therein. The resulting product was tested and was found to have a flame spread value of 20 and a smoke density value of 45.

EXAMPLE II

A series of film forming compositions according to the present invention were formulated according to the above procedure. Table 1 set forth below gives their composition and flame, smoke and water generation characteristics when tested as a film.

TABLE 1

| FILM: | 1 | 2 | 3 | 4 | 5 | 6 |
|---|---|---|---|---|---|---|
| Polyvinyl Chloride Homopolymer | 53.355 | 43.554 | 42.01 | 43.554 | 47.08 | 42.73 |
| Chlorinated Polyethylene[1] | — | 12.185 | 9.40 | 10.176 | 9.40 | 15.176 |
| Phosphate Plasticizer: | | | | | | |
| Diphenyl 2-ethylhexyl phosphate[2] | — | — | — | 14.135 | — | — |
| Decyl diphenyl phosphate[3a] | 17.13 | — | — | — | 5.38 | 14.533 |
| Tris(dichloropropyl) phosphate[2] | — | 6.092 | — | — | — | — |
| Cresyl diphenyl phosphate | — | — | 8.38 | — | — | — |
| Epoxy tallate plasticizer | 5.81 | 5.81 | 3.81 | 3.81 | 1.87 | 3.000 |
| Antimony trioxide[4] | 4.87 | 4.87 | 5.64 | 4.87 | 5.64 | 4.87 |
| Magnesium hydroxide[5] | 4.30 | 4.30 | 4.70 | 4.30 | 4.70 | 4.30 |
| Zinc borate | 4.27 | 4.27 | 4.70 | 4.27 | 4.70 | 4.27 |
| Stearic acid | 0.20 | 0.20 | 0.10 | 0.20 | — | 0.20 |
| Calcium stearate | 0.20 | 0.20 | 0.10 | 0.20 | — | 0.20 |
| Hydrated alumina | — | — | 9.39 | — | 9.39 | — |
| Trimethanol propane triheptanoate | — | 6.092 | — | — | — | — |
| Titanium dioxide | 7.785 | 7.785 | 7.76 | 7.785 | 6.70 | 7.785 |
| Barium Cadmium soap[6] | 1.04 | 1.04 | 1.50 | 1.5 | 0.52 | 1.418 |
| Barium Cadmium Zinc liquid[7] | 1.04 | 1.04 | 1.50 | 1.5 | 2.75 | 1.418 |
| Partially oxidized polyethylene[8] | — | 0.20 | — | 0.20 | — | 0.100 |
| Fexyldecyl Adipate | — | — | 2.00 | — | 1.87 | — |
| Product Characteristics | | | | | | |
| Flame Spread[9] | 15.38 | 15.38 | 15.38 | 12.85 | 12.82 | 15.5 |
| Smoke Generation[10] | 105.0 | 94.00 | 75.30 | 88.40 | 34.5 | 58.8 |
| Cold Crack Resistance[12] | Pass | Pass | Pass | Pass | Pass | Pass |
| | 0° F. | −10° F. | 0° F. | −10° F. | +10° F. | −20° F. |

TABLE 1-continued

| FILM: | 1 | 2 | 3 | 4 | 5 | 6 |
|---|---|---|---|---|---|---|
| Water Vapor Transmission[11] | 1.32 | — | — | — | 0.23 | 1.17 |

FOOTNOTES

All values for the various ingredients given above are % by weight, based on the weight of the entire formulation.

[1] Contains about 35%–45% chlorine. Suitable chlorinated polyethylenes are available from Dow Chemical Co.
[2] Santicizer 141, sold by Monsanto.
[3] Fyrol FR-2, sold by Stauffer Chemical Company.
[3a] Santicizer 148, sold by Monsanto.
[4] Thermoguard B, sold by M & T Chemicals Co.
[5] S/G 84, sold by Burns & Russell Co.
[6] Nuostabe V-1541 Stabilizer, sold by Tenneco Chemicals Co. or Mark WSX, sold by Lankro Chemicals Ltd.
[7] Nuostab V-1542 STabilizer, sold by Tenneco Chemical Co., or Mark 739, sold by Lankro Chemicals Ltd.
[8] Allied Chemical Co. 629 A
[9] & [10] Flame spread and smoke generation are measured by the Underwriter's Laboratory "Standard Test for Fire Hazard Classification of Building Materials, subject 723, published 1950. The UL 90 B ratings require a flame spread of no more than 25 and a maximum smoke density of about 50 for flame barrier constructions.
[11] Measured according to ASTM test method E 96, Method A, and given in grams/100 in$^2$ in 24 hrs.
[12] Masland S.P.I. cold crack test, ASTM D1790–62.

What is claimed:

1. A film forming composition adapted for use in a vapor barrier comprising an intimate admixture of: (1) from about 40% to 55%, by weight, of a vinyl chloride polymer; (2) from about 7% to 20%, by weight, of a chlorinated polyethylene having a chlorine content of from about 35% to about 45%; (3) from about 4% to 20%, by weight, of a phosphate ester plasticizer; (4) from about 3% to 6%, by weight, of an antimony trioxide flame retardant having a particle size of below about 5 microns; (5) from about 3% to 7%, by weight, of a magnesium hydroxide filler having a low oil absorption value and a particle size such that at least 99% of the particles have a diameter of less than 45 microns and, (6) from about 3% to 6%, by weight, of zinc borate.

2. The composition of claim 1, wherein said vinyl chloride polymer has a Relative Viscosity, as determined with a 1%, by weight, solution in cyclohexanone, at 25° C., in the range of from about 2.00 to 2.45.

3. The composition of claim 2, wherein said vinyl chloride polymer has a Relative Viscosity of about 2.20 to about 2.30.

4. The composition of claim 1, wherein said vinyl chloride polymer is polyvinyl chloride.

5. The composition of claim 1, wherein said phosphate ester plasticizer is diphenyl 2-ethylhexyl phosphate.

6. The composition of claim 1, wherein said antimony trioxide fire retardant comprises a composition containing a major proportion of a mixture of the cubic and orthorhombic forms of antimony trioxide.

7. The composition of claim 1, wherein said magnesium hydroxide filler comprises brucite having a particle size such that 99% of its particles have a diameter of less than 45 microns and an oil absorption value of about 22 cc/100 grams.

8. A composition as claimed in claim 1 which comprises a lubricant.

9. A composition as claimed in claim 8 wherein the lubricant comprises calcium stearate and stearic acid.

10. A composition as claimed in claim 9 wherein the lubricant is present at about 0.1 to 0.5%.

11. A self-supporting film derived from the composition of claim 1.

12. A self-supporting film derived from the composition of claim 8.

13. A self-supporting film derived from the composition of claim 10.

* * * * *

UNITED STATES PATENT AND TRADEMARK OFFICE
CERTIFICATE OF CORRECTION

PATENT NO. : 4,129,535
DATED : December 12, 1978
INVENTOR(S) : Robert G. Elcik

It is certified that error appears in the above-identified patent and that said Letters Patent are hereby corrected as shown below:

Col. 6, in Table 1, for Film 4, "14.135" should be -- 14.185--;

Col. 6, in Table 1, left hand column, "Tris(dichloropropyl)phosphate$^2$" should be -- Tris(dichloropropyl)phosphate$^3$--; and Col. 6, in Table 1, left hand column, "Fexyldecyl Adipate" should be -- Hexyldecyl Adipate --.

Signed and Sealed this

First Day of May 1979

[SEAL]

Attest:

RUTH C. MASON
Attesting Officer

DONALD W. BANNER
Commissioner of Patents and Trademarks